(12) United States Patent
Fujisawa et al.

(10) Patent No.: US 8,737,482 B2
(45) Date of Patent: *May 27, 2014

(54) INFORMATION PROCESSING APPARATUS AND INTER-PREDICTION MODE DETERMINING METHOD

(75) Inventors: Tatsuro Fujisawa, Akishima (JP); Yoshihiro Kikuchi, Ome (JP); Yuji Kawashima, Ome (JP); Shingo Suzuki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1551 days.

This patent is subject to a terminal disclaimer.

(21) Appl. No.: 12/027,772

(22) Filed: Feb. 7, 2008

(65) Prior Publication Data

US 2008/0198928 A1 Aug. 21, 2008

(30) Foreign Application Priority Data

Feb. 16, 2007 (JP) ................................ 2007-036846

(51) Int. Cl.
*H04N 7/30* (2006.01)
*H04N 7/50* (2006.01)

(52) U.S. Cl.
CPC ...................................... *H04N 7/50* (2013.01)
USPC ................................ 375/240.18; 375/240.12

(58) Field of Classification Search
USPC .................. 375/240, 240.02, 240.12, 240.13, 375/240.14, 240.16, 240.18, 240.2, 240.24; 348/384.1, 394.1, 403.1, 404.1, 409.1, 348/411.1
See application file for complete search history.

(56) References Cited

U.S. PATENT DOCUMENTS

| | | | | |
|---|---|---|---|---|
| 6,724,818 B1* | 4/2004 | Frojdh et al. | ............ | 375/240.07 |
| 7,280,597 B2* | 10/2007 | Zhang et al. | ............ | 375/240.16 |
| 7,643,559 B2* | 1/2010 | Kato et al. | ............... | 375/240.23 |
| 2002/0186765 A1* | 12/2002 | Morley et al. | ............. | 375/240.2 |
| 2004/0086042 A1* | 5/2004 | Kim et al. | ................ | 375/240.08 |
| 2005/0249291 A1* | 11/2005 | Gordon et al. | .......... | 375/240.18 |
| 2005/0276331 A1* | 12/2005 | Lee et al. | ................. | 375/240.17 |
| 2006/0013299 A1 | 1/2006 | Sato et al. | | |
| 2006/0104527 A1 | 5/2006 | Koto et al. | | |
| 2006/0215763 A1* | 9/2006 | Morimoto et al. | ....... | 375/240.18 |
| 2006/0276331 A1 | 12/2006 | Akamine et al. | | |
| 2008/0198928 A1 | 8/2008 | Fujisawa et al. | | |

FOREIGN PATENT DOCUMENTS

| | | |
|---|---|---|
| JP | 2003319394 | 11/2003 |
| JP | 2005151017 | 6/2005 |
| JP | 2006-25077 | 1/2006 |

(Continued)

*Primary Examiner* — Edan Orgad
*Assistant Examiner* — Curtis A Alia
(74) *Attorney, Agent, or Firm* — Blakely, Sokoloff, Taylor & Zafman LLP

(57) ABSTRACT

According to one embodiment, an information processing apparatus includes an inter-prediction unit which generates a prediction signal, a transformation unit which orthogonal transform a prediction residual signal between the prediction signal and a picture signal of the macro block, and an inter-prediction mode determining unit which determines a combination of an inter-prediction mode used by the inter-prediction unit and DCT used by the transformation unit for each macro block. The inter-prediction mode determining unit includes a first selection unit which selects a preset number of inter-prediction modes from plural types of inter-prediction mode with a specified type of DCT, and a second selection unit which selects a combination of one inter-prediction mode and one DCT from the preset number of inter-prediction modes selected by the first selection unit and the plural types of DCT.

12 Claims, 6 Drawing Sheets

(56) References Cited

FOREIGN PATENT DOCUMENTS

| JP | 2006-93777 | 4/2006 |
| JP | 2006-140758 | 6/2006 |
| JP | 2006148419 | 6/2006 |
| JP | 2008332986 | 12/2006 |
| JP | 2007201558 | 8/2007 |
| JP | 2008205627 | 9/2008 |
| JP | 2008219205 | 9/2008 |

* cited by examiner

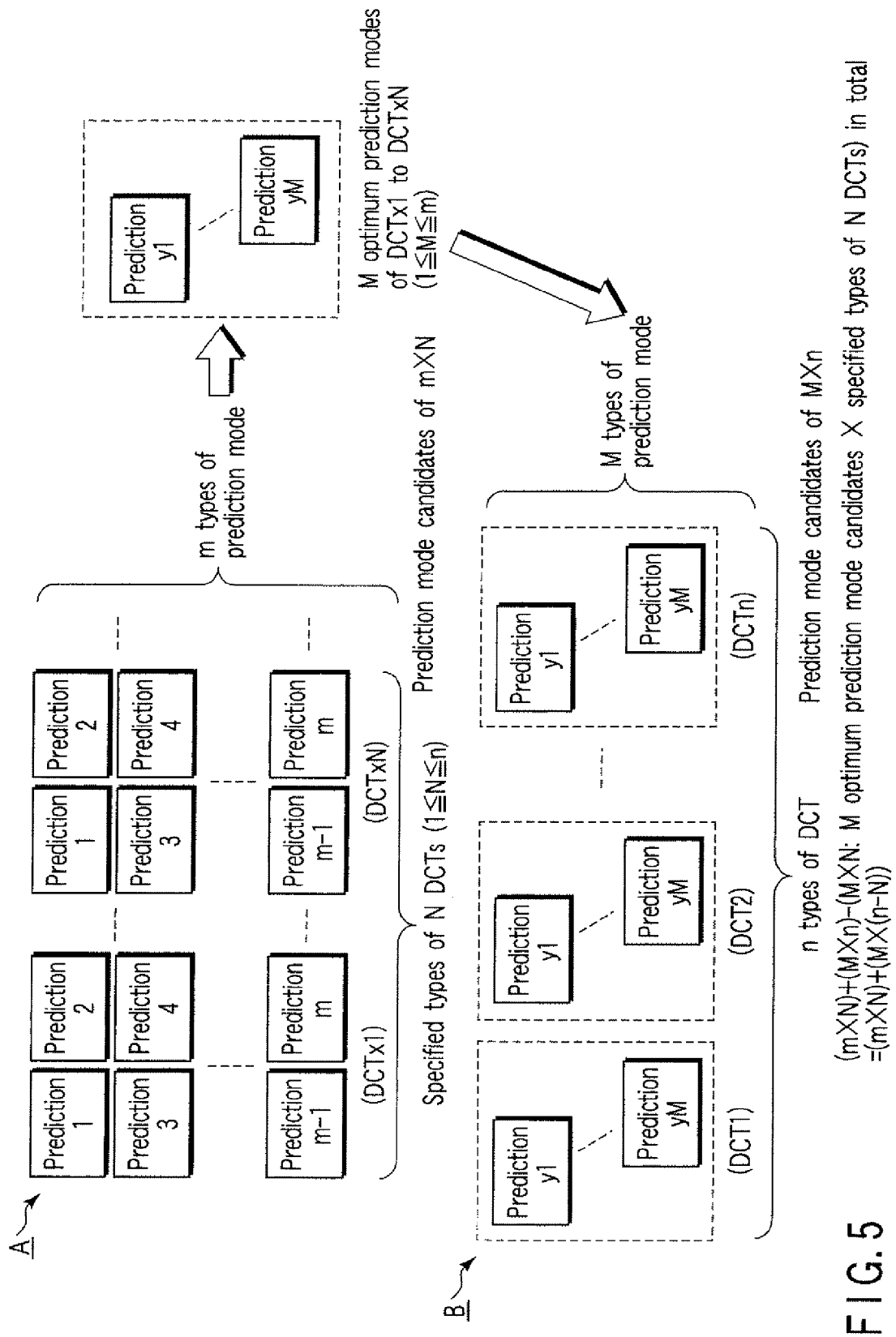
F I G. 5

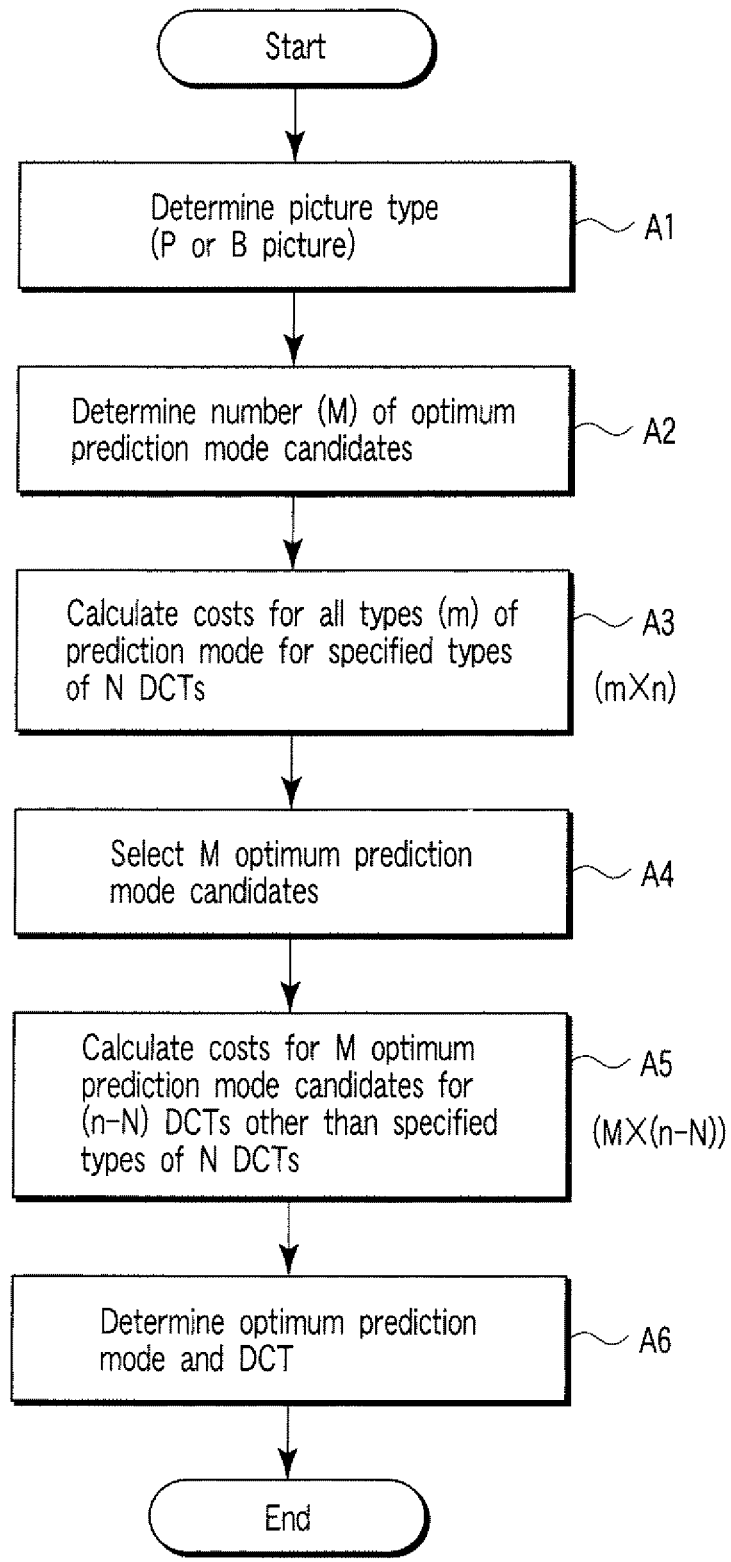
F I G. 8

INFORMATION PROCESSING APPARATUS AND INTER-PREDICTION MODE DETERMINING METHOD

CROSS-REFERENCE TO RELATED APPLICATIONS

This application is based upon and claims the benefit of priority from Japanese Patent Application No. 2007-036846, filed Feb. 16, 2007, the entire contents of which are incorporated herein by reference.

BACKGROUND

1. Field

One embodiment of the invention relates to a moving picture encoding technique applied to an information processing apparatus such a personal computer.

2. Description of the Related Art

In recent years, personal computers having software encoders mounted thereon to encode moving pictures according to softwares start to be popularly and widely used. Further, recently, as the next-generation moving picture compression encoding technique, much attention is being paid to the H.264/Advanced Video Coding (AVC) standard.

The H.264/AVC standard is the compression encoding technique having higher performance in comparison with the conventional compression encoding technique such as MPEG2 or MPEG4. Therefore, in the encoding process corresponding to the H.264/AVC standard, a larger processing amount is required in comparison with the conventional compression encoding technique such as MPEG2 or MPEG4. Based on the above fact, various proposals have been made to reduce the moving picture encoding processing amount (for example, refer to Jpn. Pat. Appln. KOKAI Publication No. 2006-25077).

In the encoding process corresponding to the H.264/AVC standard, a processing amount for determination of a prediction mode for each macro block is large. Particularly, in a high profile (HP), an optimum one of the discrete cosine transformation (DCT) of the block size of 4×4 pixels and the DCT of the block size of 8×8 pixels can be selected when the block size of the prediction mode is 8×8 pixels or more in the inter-predicting operation.

As a result, (prediction modes of the prediction mode number×2 are provided in practice) and a processing amount for the prediction mode determination process of the inter-predicting operation increases with the number of prediction mode candidates. Therefore, it is strongly required to develop a mechanism which efficiently performs the prediction mode determination process while suppressing a lowering in the picture quality or the like, for example.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is an exemplary diagram for illustrating a basic principle of the prediction mode determining process performed by the inter-prediction mode determining unit by use of the video encoder application operated on the computer of the embodiment.

FIG. 8 is an exemplary flowchart showing an operation procedure of the prediction mode determining process performed by the inter-prediction mode determining unit by use of the video encoder application operated on the computer of the embodiment.

DETAILED DESCRIPTION

Various embodiments according to the invention will be described hereinafter with reference to the accompanying drawings. In general, according to one embodiment of the invention, an information processing apparatus which encodes a moving picture signal, includes an inter-prediction unit configured to generate a prediction signal by use of one of plural types of inter-prediction mode having different block sizes set as a processing unit for macro blocks obtained by dividing a to-be-encoded screen picture, a transformation unit configured to orthogonal transform a prediction residual signal between the prediction signal generated by the inter-prediction unit and a picture signal of the macro block by use of discrete cosine transformation (DCT) among plural types of DCT using different block sizes as a processing unit, and an inter-prediction mode determining unit configured to determine a combination of an inter-prediction mode used by the inter-prediction unit and DCT used by the transformation unit for each macro block from the plural types of inter-prediction mode and the plural types of DCT, and the inter-prediction mode determining unit including a first selection unit configured to select a preset number of inter-prediction modes from the plural types of inter-prediction mode with a specified type of DCT among the plural types of DCT used as an object, and a second selection unit configured to select a combination of one inter-prediction mode and one DCT from the preset number of inter-prediction modes selected by the first selection unit and the plural types of DCT.

Figure 1:
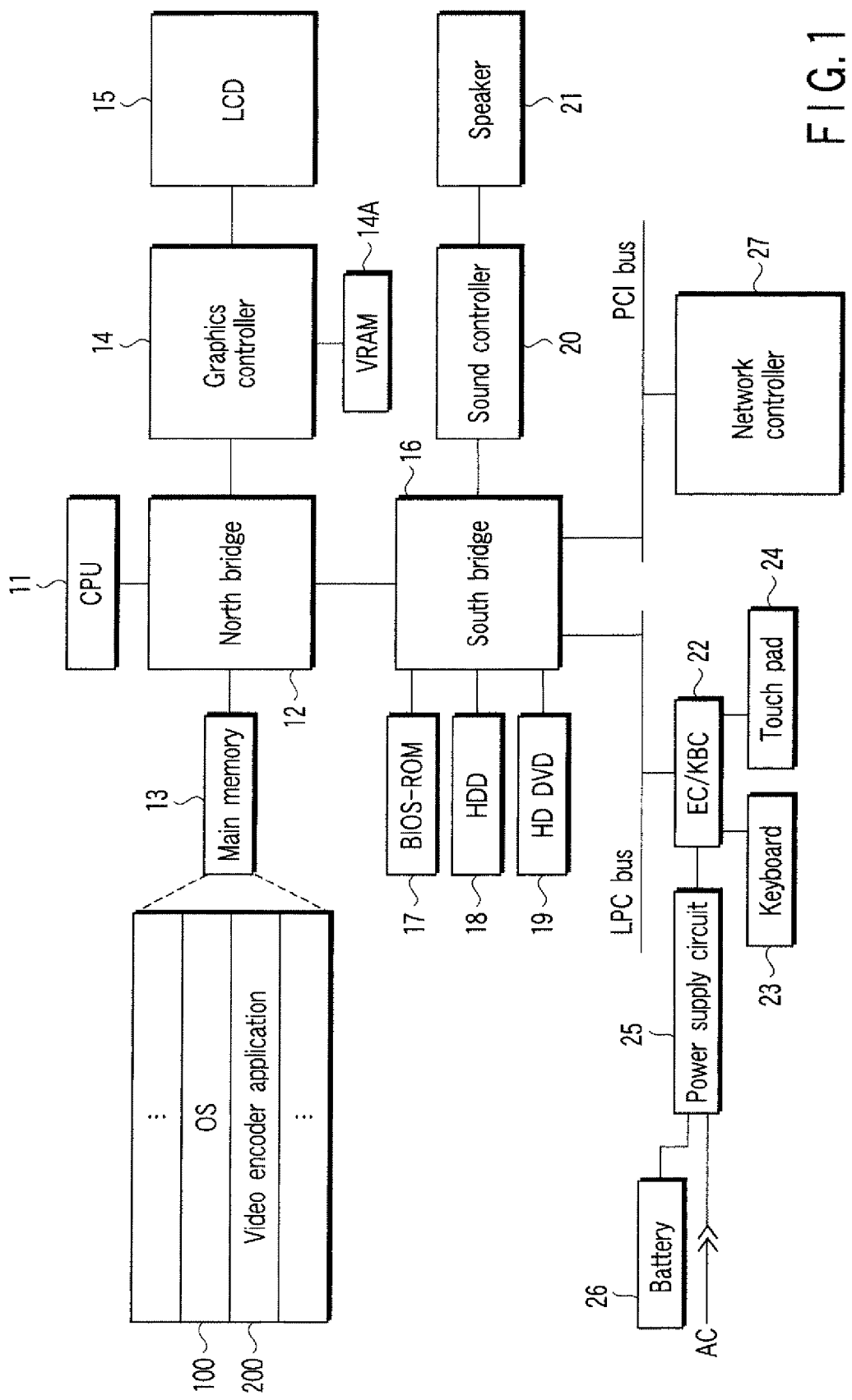
FIG. 1 is an exemplary diagram showing a configuration of an information processing apparatus (personal computer) according to one embodiment of this invention.

In FIG. 1, an example of the configuration of an information processing apparatus according to the present embodiment is shown. The information processing apparatus is realized as a notebook type personal computer which can be battery-driven, for example.

As shown in FIG. 1, the computer includes a CPU 11, north bridge 12, main memory 13, graphics controller 14, VRAM 14A, LCD 15, south bridge 16, BIOS-ROM 17, HDD 18, HD DVD 19, sound controller 20, speaker 21, embedded controller/keyboard controller IC (EC/KBC) 22, keyboard 23, touch pad 24, power supply circuit 25, battery 26, network controller 27 and the like.

The CPU 11 is a processor which controls the operation of the respective units of the computer. The CPU 11 executes an operating system (OS) 100 loaded from the HDD 18 into the main memory 13 and various application programs containing utility operated under the control of the OS 100. Among the various application programs, a video encoder application 200 is contained. The video encoder application 200 is software for encoding a moving picture and is operated as a software encoder corresponding to the H.264/AVC standard. Further, the CPU 11 executes a BIOS stored in the BIOS-ROM 17. The BIOS is a program for controlling various hardware units.

The north bridge 12 is a bridge device which connects the south bridge 16 to a local bus of the CPU 11. The north bridge 12 has a function of making communication with the graphics controller 14 via the bus and contains a memory controller which controls access to the main memory 13. The graphics controller 14 is a display controller which controls the LCD 15 used as a display monitor of the computer. The graphics controller 14 creates and generates a display signal to be transmitted to the LCD 15 based on picture data written in the VRAM 14A.

The south bridge 16 is a controller which controls various devices on a PCI bus and LPC bus. Further, the south bridge 16 is directly connected to the BIOS-ROM 17, HDD 18, HD DVD 19 and sound controller 20 and has a function of controlling the above devices. The sound controller 20 is a sound source controller which controls the speaker 21.

The EC/KBC 22 is a one-chip microcomputer in which an embedded controller for power management and a keyboard controller used to control the keyboard 23 and touch pad 24 are integrated. The EC/KBC 22 cooperates with the power supply circuit 25 to control supply of power from the battery 26 or external AC power source to the respective units. The network controller 27 is a communication device which performs communication with the external network such as the Internet, for example.

Figure 2:
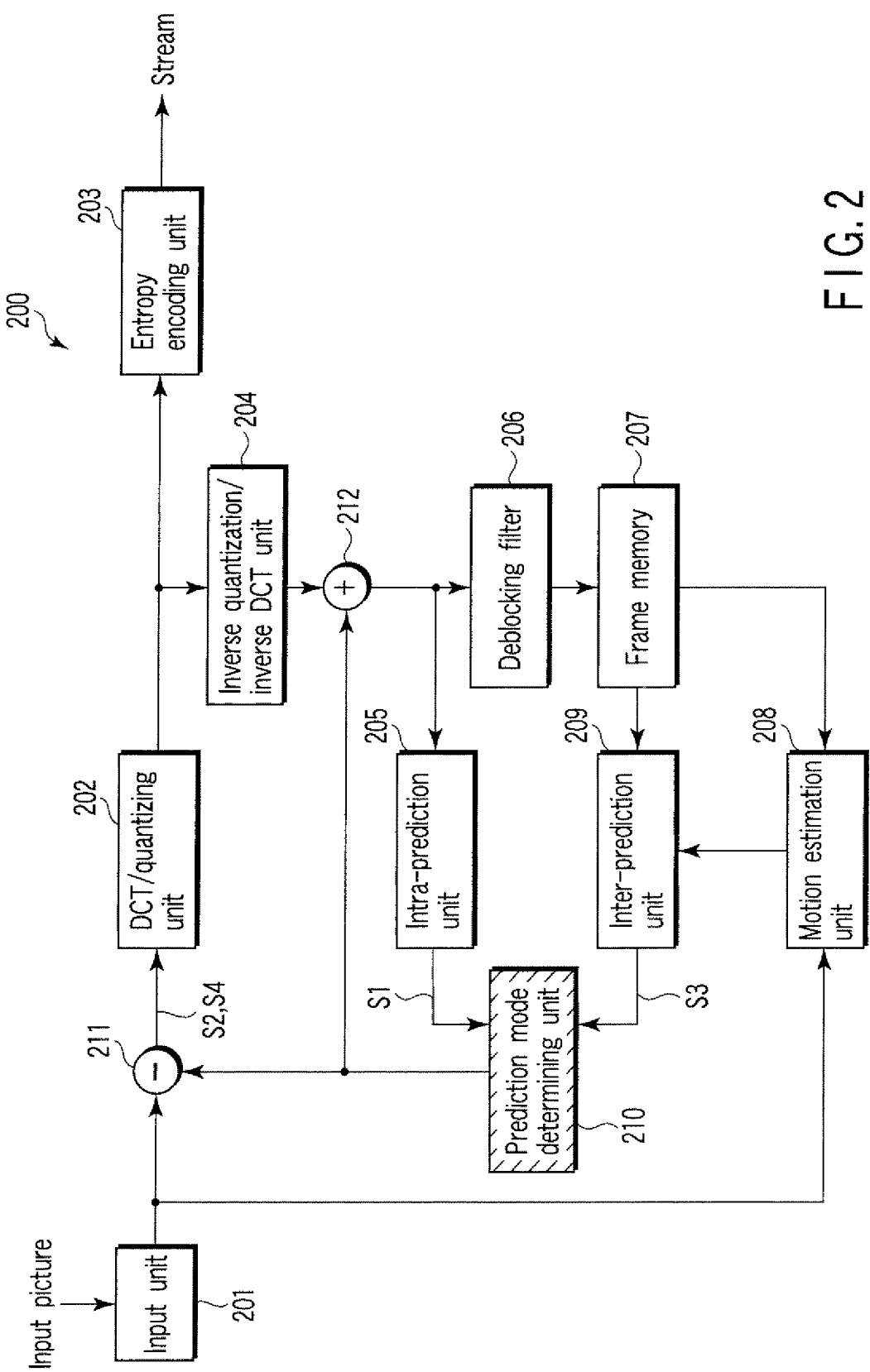
FIG. 2 is an exemplary diagram showing a functional configuration of a software encoder which is realized by a video encoder application operated on a computer of the embodiment.

Next, the functional configuration of the software encoder realized by the video encoder application 200 operated on the computer with the above hardware configuration is explained with reference to FIG. 2.

The encoder process by the video encoder application 200 corresponds to the H.264/AVC standard. As shown in FIG. 2, the video encoder application 200 includes an input unit 201, DCT/quantizing unit 202, entropy encoding unit 203, inverse quantization/inverse DCT unit 204, intra-predicting unit 205, de-blocking filter 206, frame memory 207, motion estimation unit 208, inter-predicting unit 209, prediction mode determining unit 210, adding units 211, 212 and the like.

Figure 3:
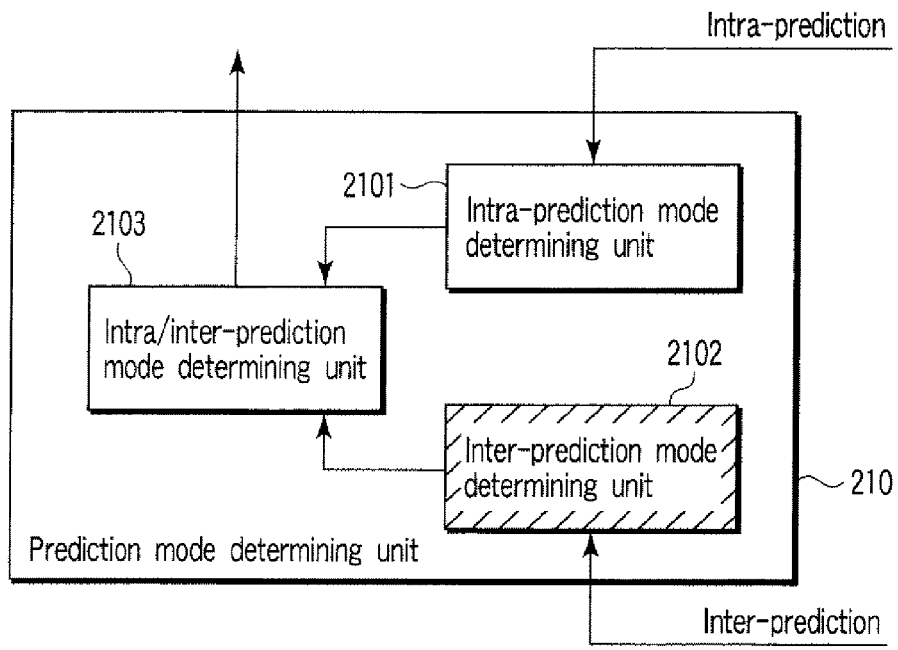
FIG. 3 is an exemplary diagram showing a functional block of a prediction mode determining unit for the video encoder application operated on the computer of the embodiment.

The video encoder application 200 performs the encoding process for each screen picture (picture) input from the input unit 21 in the macro block unit of 16×16 pixels, for example. The prediction mode determining unit 210 selects one of an in-frame prediction encoding mode (intra-prediction mode) and a motion compensation frame-frame prediction encoding mode (inter-prediction mode) for each macro block. FIG. 3 shows the functional configuration of the prediction mode determining unit 210.

As shown in FIG. 3, the prediction mode determining unit 210 includes an intra-prediction mode determining unit 2101, inter-prediction mode determining unit 2102 and intra/inter-prediction mode determining unit 2103.

A plurality of prediction mode candidates which can be selected for each macro block are provided in each of the intra-prediction mode and inter-prediction mode. First, each of the intra-prediction mode determining unit 2101 and inter-prediction mode determining unit 2102 selects a prediction mode candidate which is most excellent in cost (the distortion to the encoding amount is less) from the plurality of prediction mode candidates. Secondly, the intra/inter-prediction mode determining unit 2103 compares the two prediction mode candidates respectively selected by the intra-prediction mode determining unit 2101 and inter-prediction mode determining unit 2102 and finally selects the prediction mode which is more excellent in cost, that is, one of the intra-prediction mode and inter-prediction mode.

Figure 4:
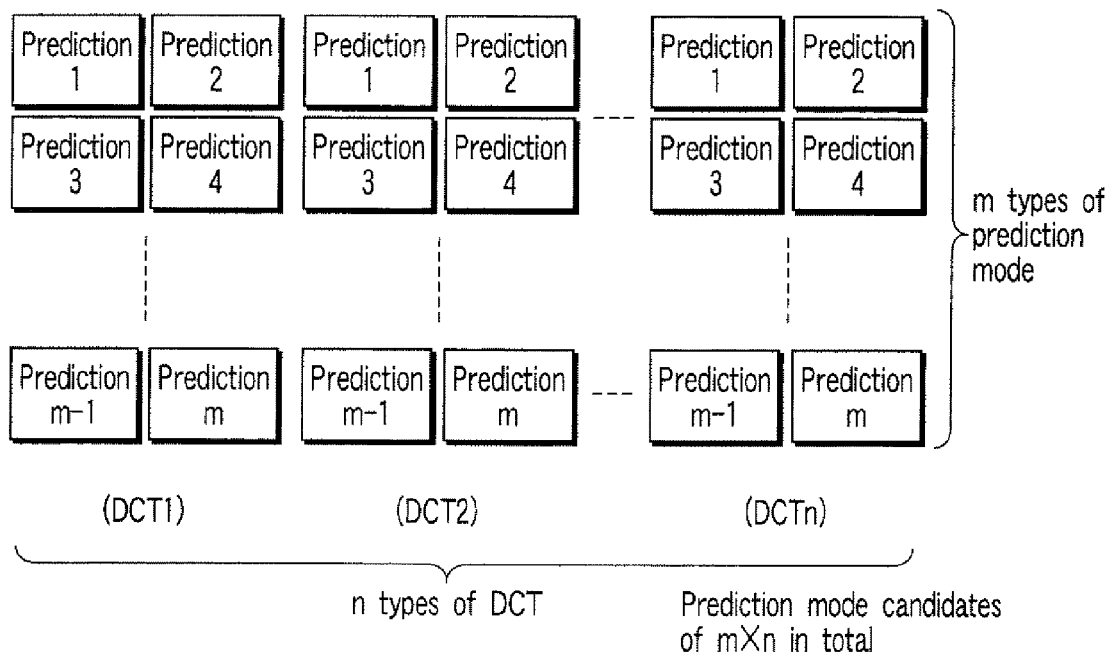
FIG. 4 is an exemplary diagram for illustrating a general basic principle of a prediction mode determining process of the inter-predicting operation.

In the high profile of the H.264/AVC standard, an optimum one of the DCT with the block size of 4×4 pixels and the DCT with the block size of 8×8 pixels can be selected when the block size of the prediction mode is 8×8 pixels or more in the inter-prediction process. Therefore, if m types of prediction mode are provided and n types of DCT can be selected in a certain standard, m×n prediction mode candidates may be substantially provided only in the inter-prediction process as shown in FIG. 4. In such a condition, if all prediction mode candidates are evaluated and an optimum prediction mode candidate is selected without considering any device, a processing amount required for the prediction mode determination in the inter-prediction process will become extremely large. Therefore, for example, the inter-prediction mode determining unit 2102 of the computer has a mechanism which efficiently performs the prediction mode determination process while suppressing a lowering in the picture quality. The mechanism is explained in detail below.

The software encoder having the functional configuration shown in FIG. 2 performs an encoding process in the intra-prediction encoding mode as follows. That is, the intra-predicting unit 205 generates a prediction signal s1 based on a to-be-encoded screen picture (picture), the DCT/quantizing unit 202 orthogonal transform and quantize a prediction error signal s2 obtained by subtracting the prediction signal s1 from the to-be-encoded screen picture (picture) and the entropy encoding unit 203 performs an entropy encoding process for intra-prediction mode information and quantized orthogonal transformation coefficients.

Further, the software encoder performs an encoding process in the inter-prediction encoding mode as follows. First, the motion estimation unit 208 estimates the motion in the screen picture (picture) which is stored in the frame memory 207 and is already encoded and then the inter-predicting unit 209 generates a motion compensation frame-frame prediction signal s3 corresponding to the to-be-encoded screen picture in the predetermined block shape unit. After this, the DCT/quantizing unit 202 subjects a prediction error signal s4 obtained by subtracting the motion compensation frame-frame prediction signal s3 from the to-be-encoded screen picture (picture) to orthogonal transformation and quantization and then the entropy encoding unit 203 performs an entropy encoding process for inter-prediction mode information and quantized orthogonal transformation coefficients.

Further, the inverse quantization/inverse DCT unit 204 performs the inverse quantization and inverse orthogonal transformation operations for the quantization coefficients of the screen picture (picture) subjected to orthogonal transformation and quantization and the de-blocking filter 206 performs a de-blocking filter process t reduce the block noise.

FIG. 5 is an exemplary diagram for illustrating a basic principle of the prediction mode determining process performed by the inter-prediction mode determining unit 2102 of the computer.

The optimum prediction mode candidates have the properties which become the same to some extent irrespective of the DCT. Therefore, even when the prediction mode is previously selected and the prediction modes used to perform the selection and determination process for the optimum DCT are narrowed down, it can be said that the possibility that a combination of the truly optimum prediction mode and DCT can be selected is relatively strong. Much attention is paid to the above property and the inter-prediction mode determining unit 2102 of the computer first performs the prediction mode determining process in the condition of specified DCT and selects an optimum prediction mode candidate (A in FIG. 5). Then, the inter-prediction mode determining unit 2102 performs a determination process to select the optimum DCT with only the optimum prediction mode candidate used as an object and finally determines a prediction mode (B in FIG. 5). At this time, since the specified DCT is already evaluated at the optimum prediction mode candidate selection time, it is only required to evaluate DCTs other than the specified DCT.

Figure 6:
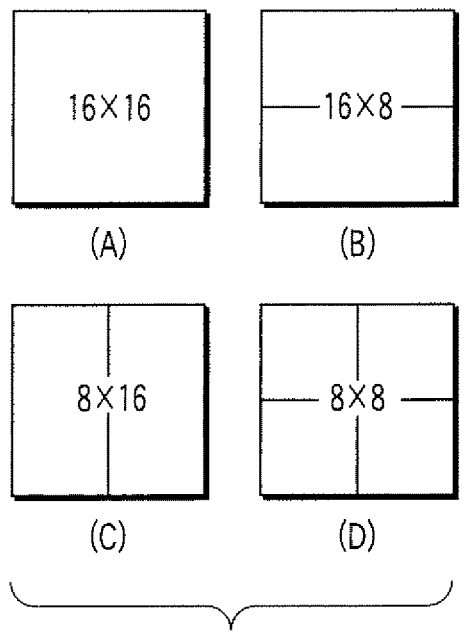
FIG. 6 is an exemplary first diagram for illustrating a prediction mode determining process performed by the inter-prediction mode determining unit by use of the video encoder application operated on the computer of the embodiment (a diagram showing an example of the types of prediction mode).
Figure 7:
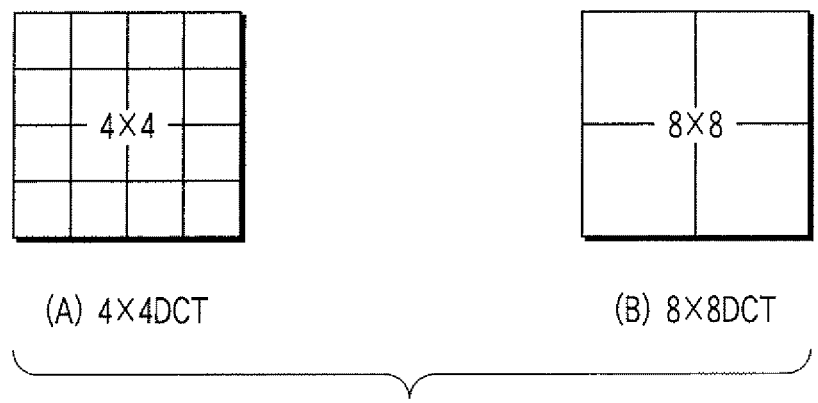
FIG. 7 is an exemplary second diagram for illustrating a prediction mode determining process performed by the inter-prediction mode determining unit by use of the video encoder application operated on the computer of the embodiment (a diagram showing an example of the types of DCT).

A more concrete example is explained below. As shown in FIG. 6, in the high profile of the H.264/AVC standard, four types of prediction mode using different block sizes of 16×16, 16×8, 8×16 and 8×8 pixels as the processing unit are provided. Further, as shown in FIG. 7, in the high profile of the H.264/AVC standard, two types of prediction mode using different block sizes of 4×4 and 8×8 pixels as the processing unit are provided. Therefore, the number of prediction mode candidates is set to 4 (m in FIGS. 4 and 5)×2 (n in FIGS. 4 and 5)=8.

On the other hand, the inter-prediction mode determining unit 2102 of the computer first evaluates the prediction mode only by use of one (N in FIG. 5) type of DCT of, for example, 4×4 pixels among the two types of DCT of 4×4 and 8×8 pixels (the number of candidates is 4(m)×1(N)) and selects one (M in FIG. 5) of the optimum prediction mode candidates, for example. Then, only one optimum prediction mode candidate obtained by use of the DCT of 4×4 pixels is used as an object, the prediction mode is evaluated by use of the DCT of 8×8 pixels (the number of candidates is 1(M)×(2(n)−1(N))) and thus a prediction mode is finally determined.

That is, in this case (wherein the number of optimum prediction mode candidates is set to one), the inter-prediction mode determining unit 2102 of the computer reduces the number of prediction mode candidates (by three) to 4+1=5. Since the probability that the optimum prediction modes determined by use of the DCT of 4×4 pixels and the DCT of 8×8 pixels become the same is high, the possibility that the truly optimum combination can be selected is strong and a lowering in the picture quality will not substantially occur.

Further, the inter-prediction mode determining unit 2102 of the computer performs a control operation to set the number of optimum prediction mode candidates in the case of the B picture which can be easily and correctly predicted to one and increase the same to two in the case of the P picture. That is, the inter-prediction mode determining unit 2102 reduces the processing amount required for the prediction mode determining process while adaptively suppressing the lowering in the picture quality by determining the number of prediction mode candidates according to the types of picture.

FIG. 8 is an exemplary flowchart showing an operation procedure of the prediction mode determining process performed by the inter-prediction mode determining unit 2102 of the computer.

The inter-prediction mode determining unit 2102 first determines whether the to-be-encoded screen picture is a P picture or B picture (block A1) and determines the number of optimum prediction mode candidates, for example, sets two in the case of the P picture and sets one in the case of the B picture based on the above determination result (block A2).

Next, the inter-prediction mode determining unit 2102 calculates the costs for all types of prediction mode of a specified type of DCT among plural types of DCT (block A3). Then, the inter-prediction mode determining unit 2102 selects optimum prediction mode candidates of a number corresponding to the number of candidates previously determined based on the cost calculation result (block A4).

After this, the inter-prediction mode determining unit 2102 calculates the costs for the optimum prediction mode candidates selected by a number corresponding to the previously determined number of candidates for DCTs other than the specified type of DCT (block A5) and determines an optimum prediction mode and DCT (based on the costs associated with the specified type of DCT already calculated in block A3) (block A6).

As described above, according to the computer, the prediction mode determining process in the inter-prediction operation can be efficiently performed without causing a lowering in the picture quality, for example.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
an encoder configured to encode a moving picture signal, wherein the encoder is configured to:
generate a prediction signal by use of one of a plurality of types of inter-prediction modes having different block sizes set as a processing unit for macro blocks obtained by dividing a to-be-encoded screen picture, the one of the plurality of types of inter-prediction modes being an optimum type of inter-prediction mode;
orthogonal transform a prediction residual signal by use of one of a plurality of types of discrete cosine transformations (DCT) using different block sizes as a processing unit, wherein the prediction residual signal is obtained by subtracting the prediction signal from a picture signal of the macro block, and wherein the one of the plurality of types of DCTs is an optimum DCT; and
determine a combination of the optimum inter-prediction mode used to generate the prediction signal and the optimum DCT used to orthogonal transform the prediction residual signal for each macro block, wherein the determining the combination comprises:
calculating first costs associated with each of the plurality of types of inter-prediction modes in combination with each of one or more specified DCTs, a number of the one or more specified types of DCTs being less than the total number of the plurality of types of DCTs,
selecting a preset number of types of inter-prediction modes from the plurality of types of inter-prediction modes based on the calculated first costs, the preset number being less than a total number of the plurality of types of inter-prediction modes, calculating second costs associated each of the selected preset number of types of prediction modes in combination with each of the plurality of types of DCTs, and selecting one of the selected preset number of types of inter-prediction modes as the optimum inter-prediction mode and one of the plurality of types of DCTs as the optimum DCT based on the calculated second costs.

2. The information processing apparatus according to claim 1, wherein:

the block sizes of the plurality of types of DCTs comprises two DCTs, the two DCTs including a DCT having a first block size as a processing unit and a DCT having a second block size that is larger than the first block size as a processing unit, and the one or more specified types of DCTs is one of the two DCTs.

3. The information processing apparatus according to claim 2, wherein the first block size is set to 4×4 pixels and the second block size is set to 8×8 pixels.

4. The information processing apparatus according to claim 1, wherein the block sizes of the plurality of types of inter-prediction modes are set to 16×16, 16×8, 8×16 and 8×8 pixels.

5. The information processing apparatus according to claim 1, wherein the preset number is determined according to a type of a to-be-encoded screen picture.

6. The information processing apparatus according to claim 1, wherein the preset number is determined to be smaller when the to-be-encoded screen picture is a B picture than when the to-be-encoded screen picture is a P picture.

7. The information processing apparatus according to claim 1, wherein the calculating the second costs does not include calculating costs associated with each of the selected preset number of types of inter-prediction modes in combination with each of the one or more specified types of DCTs.

8. An inter-prediction mode determining method of an information processing apparatus which encodes a moving picture signal and comprises an inter-prediction module configured to generate a prediction signal by use of one of a plurality of types of inter-prediction modes with different block sizes set as a processing unit for macro blocks obtained by dividing a to-be-encoded screen picture and a transformation module configured to orthogonal transform a prediction residual signal by use of one of a plurality of discrete cosine transformations (DCT) using different block sizes as a processing unit, the one of the plurality of types of inter-prediction modes is an optimum inter-prediction mode and the one of the plurality of DCTs is the optimum DCT, the method comprising:

calculating first costs associated with each of the plurality of types of inter-prediction modes in combination with each of one or more specified types of DCTs, a number of the one or more specified types of DCTs being less than the total number of the plurality of types of DCTs;

selecting a preset number of types of inter-prediction modes from the plurality of types of inter-prediction modes based on the calculated first costs, the preset number being less than a total number of the plurality of types of inter-prediction modes;

calculating second costs associated with each of the selected preset number of types of inter-prediction modes in combination with each of the plurality of types of DCTs; and selecting one of the selected preset number of types of inter-prediction modes as the optimum inter-prediction mode and one of the plurality of types of DCTs as the optimum DCT based on the calculated second costs.

9. The inter-prediction mode determining method according to claim 8, wherein:

the block sizes of the plurality of types of DCTs comprises two DCTs, the two DCTs including a DCT having a first block size as a processing unit and a DCT having a second block size that is larger than the first block size as a processing unit, and the one or more specified types of DCTs is one of the two DCTs.

10. The inter-prediction mode determining method according to claim 9, wherein the first block size is set to 4×4 pixels and the second block size is set to 8×8 pixels.

11. The inter-prediction mode determining method according to claim 8, wherein the preset number is determined according to a type of a to-be-encoded screen picture.

12. The inter-prediction mode determining method according to claim 11, wherein the preset number is determined to be smaller when the to-be-encoded screen picture is a B picture than when the to-be-encoded screen picture is a P picture.

* * * * *